March 13, 1951 H. ZIEBOLZ ET AL 2,545,405
ELECTRICAL MOTOR CONTROL SYSTEM
Filed March 13, 1946
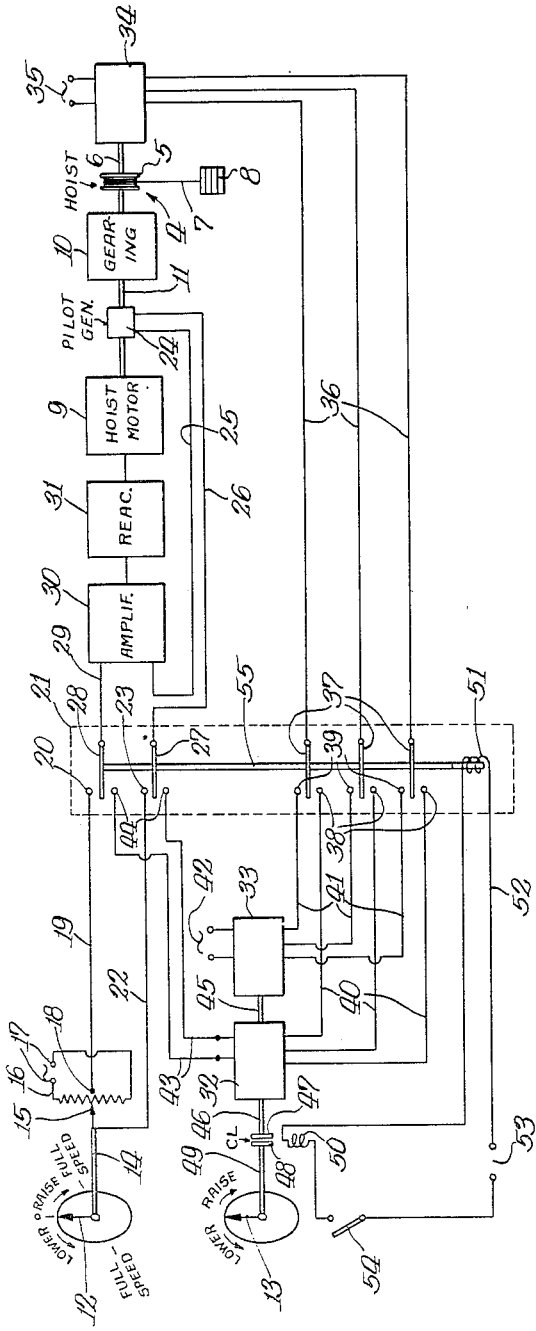
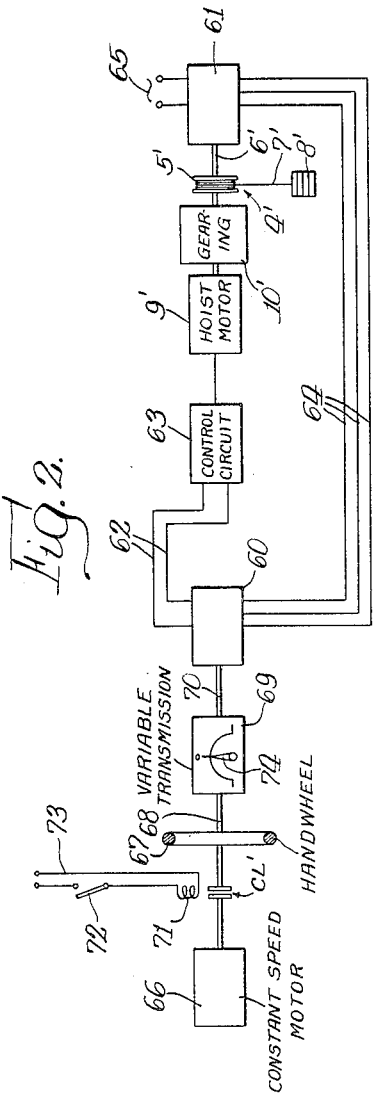
INVENTORS.
*Herbert Ziebolz,*
BY *Paul Glass,*

Patented Mar. 13, 1951

2,545,405

UNITED STATES PATENT OFFICE 2,545,405

ELECTRICAL MOTOR CONTROL SYSTEM

Herbert Ziebolz and Paul Glass, Chicago, Ill., assignors to Askania Regulator Company, Chicago, Ill., a corporation of Illinois Application March 13, 1946, Serial No. 654,050

6 Claims. (Cl. 318—30)

The invention relates generally to an electrical control circuit and more particularly to a circuit for controlling the movement of a member such as the carriage of a machine tool, the hook of a hoist, the beam of a crane, or the like.

A general object of the invention is to provide a new and improved electrical system for controlling a member so as to effect a rapid movement of the member from one position to another while accurately positioning the member in its new position.

Another object is to provide a new and improved electrical system for rapidly moving a member from one position to another while accurately positioning the member in its new position, in which the system is independent of the characteristics of the particular electric motor employed to drive the member and is also independent of the nature of the load provided by the member.

Another object is to provide an electrical system for controlling a movable member employing a combination of speed control and position control.

Still another object is to provide an electrical system for controlling a movable member having means utilizing the speed of movement of the member for rough control of the member and means utilizing the position of the member for a fine control and final and accurate positioning of the member.

A further object is to provide an electrical system for controlling a movable member having a first control means for rough control of the member and a second control means for fine control of the member, said second control means being inoperative while said first control means is being employed but being maintained in precisely related position with the controlled member and operable at the will of an attendant to take over control of the member from the first control means.

A further object is to provide an electrical system for controlling a movable member having a first control means for causing movement of the member in either of two directions and at any speed within the range of speeds of the power means driving the member, this first control means being operable to control the speed of the member only; and a second control means operable to take over control from said first means in any position of the member, this second control means governing the position of the member and causing the member accurately to follow the movement of a manual control element.

Other objects and advantages will become apparent from the following detailed description taken in connection with the accompanying drawings, in which:

Fig. 1 is a block type circuit diagram of a system embodying the features of this invention.

Fig. 2 is a block type circuit diagram showing a modified form of the invention.

While the invention is susceptible of various modifications and alternative constructions, it is shown in the drawings and will hereinafter be described in a preferred form and one modification. It is not intended, however, that the invention is to be limited thereby to the specific disclosures made. On the contrary, it is intended to cover all modifications and alternative constructions falling within the spirit and scope of the invention as defined in the appended claims.

As above stated, there are many industrial applications in which it is desirable that a movable member be so controlled that it may be quickly moved from one position to an approximately new position and then precisely positioned and held in the new position. By way of exemplary disclosure, the invention herein will be described as employed for the control of a hoist, for in such an application in particular there is usually need for moving the load-carrying member of the hoist through considerable distances and yet it is frequently necessary, particularly where the hoist is employed in assembly work, that the object carried by the hoist be very slowly lowered to assume a very precise position with respect to some other part of the product being assembled. Such a hoist is diagrammatically represented in Fig. 1 by the general reference character 4, with the element 5 more particularly representing a winch or drum fixedly mounted on a shaft 6 and having wound thereon a cable or like means 7 carrying at its free end an electromagnet, grapple hook, or other means represented at 8 and constituting the member whose movements and position are to be controlled. The hoist, more particularly the shaft 6 thereof, is driven by an electric motor 9 preferably and commonly through suitable gearing 10 interposed between the hoist shaft 6 and the motor shaft 11. The motor and the gearing together constitute reversible and variable power means for driving the shaft 6 of the hoist at varying speeds in either direction of rotation. Normally the motor 9 will be, and is herein, a reversible, variable speed motor but it is not to be understood that it must necessarily be so. Contemplated as alternative constructions would be the employment of gearing adaptable to reverse the direction of rotation of the hoist shaft 6 though the motor shaft 11 may always rotate in one direction; and also contemplated is the possibility that the hoist motor may operate at constant speed with variation in hoist shaft speed as well as direction being effected through control of the gearing 10.

To control the motor 9 so as to obtain the objectives of this invention, the control system comprises generally a first control means which governs the speed of movement of the controlled member 8. This means includes a manual control element 12 and is operable in accordance with the direction and extent of movement of this manual control element from a normal position to govern the direction and speed at which the controlled member 8 is driven, independently of the distance through which the member is to be driven. This control means utilizes the speed of movement of the controlled member as the counteracting control signal and is suitable and utilized for rough control and positioning of the member 8 only. It will in the balance of the specification and in the claims be referred to as "speed control means."

A second control means is provided for governing movement of the member 8 for its final and accurate positioning. This control means will in the balance of the specification and in the claims be referred to as "position control means." It includes a second manual control element 13 and is operable at the will of the attendant to take over control of the hoist from the speed control means and to cause the controlled member 8 to have a movement and to take up a position corresponding precisely to that of the manual control element 13. The position control means utilizes the position of the controlled member 8 as distinguished from the speed thereof as the counteracting control signal and thus assures accurate and precise positioning of the controlled member.

Though the position control means is idle and ineffective while the speed control means is exercising its control, it is a feature of this invention that portions of the position control means are maintained in precisely coordinated relationship with the controlled member 8 and thus are at all times and in any position of the controlled member 8 operable to take over control of the member 8.

Turning now particularly to the form of the invention shown in Fig. 1, the speed control means comprises the manual control element 12 already mentioned. This element is, through the medium of a shaft 14, for example, fixedly associated with the movable contact 15 of a potentiometer 16, herein shown as having its opposite ends connected through terminals 17 to an alternating current voltage source. The midpoint 18 of the potentiometer 16 is by a lead 19 connected to one stationary contact 20 of a multiple blade switch 21. The movable contact 15 of the potentiometer is by a lead 22 connected to a second stationary contact 23 of the switch 21. The potentiometer functions in well known manner under the control of the element 12 to produce an alternating current signal of opposite phase as the control element 12 is swung in one direction or the opposite direction from its normal position, so as to determine the direction of movement of the controlled member 8; and likewise functions to produce a signal increasing in magnitude as the control element 12 is swung progressively away from its normal position in either direction, which signal bears a relationship to the speed at which controlled member 8 is driven. The potentiometer 16 thus becomes the main signal generating means.

Supplementing the potentiometer is a means 24 operable to generate a signal of a magnitude proportional to the speed of movement of the controlled member 8 and of a phase depending upon the direction of movement of the controlled member 8. This means is herein shown as a pilot generator driven directly from the motor shaft 11 and connected by leads 25 and 26 to have an inverse feed-back relationship with the signals generated by the potentiometer 16. The signal generated by the means 24 will hereinafter be referred to as the operation indicating or pilot signal, and the signal resulting from a combination of the main signal and the "pilot" signal will be known and referred to as the "control" signal. The lead 26 is here shown connected to a blade 27 of the switch 21 adapted in one position to make contact with the contact 23. A second blade 28 is adapted to make contact with the contact 20 and this blade is by a lead 29 connected to an amplifier 30 as is also the lead 25. The amplifier may be of any well known construction capable of responding to an alternating current signal of varying magnitude and operating to produce a signal of a character and magnitude suitable and capable of controlling the speed and direction of rotation of the motor 9. Herein the amplifier 30 is shown as controlling the motor 9 through a reactor means 31 it being understood that the disclosure of reactor means herein is merely to indicate the desirabliity thereof and not the indispensability. The speed control means operates as more particularly disclosed in the Soller et al. application, Serial No. 569,476, filed December 23, 1944, to drive the hoist 10 in a direction and at a speed called for by adjustment of the manual control element 12. This speed is very accurately maintained for the magnitude of the control signal is in part determined by the speed at which the hoist is being operated and if that speed becomes too great the control signal is diminished, and, conversely, if the speed is not great enough the control signal is increased. As a result, the speed is maintained at the speed called for by the adjustment of the control element 12, and the speed at which the member 8 is driven is in no way related, at any time during such drive, to the distance of the member from its intended position at the selected termination of the traversing drive period.

The position control means includes the manual control element 13 already mentioned and additionally includes means operable to cause the hoist accurately and precisely to follow the movements of and to assume a position corresponding to that of the control element 13. This means also includes devices whereby the control means is normally idling or ineffective but is operable at the will of the attendant to wrest control from the speed control means. In order that the position control means may be operative to take over control at any time and in any position of the hoist, it is arranged to have a part thereof maintained in precise positional relationship with the hoist. This latter part, speaking generally, includes a plurality of electrical devices one of which is associated with the hoist and, during the control of the hoist by the speed control means, serves as a master controlling a second electrical device located at the control station to maintain this positional relationship with respect to the hoist. The position control means is such that this second electrical device, during the control of the hoist by the position control means, throws off its slave character and becomes the master controlling the operation of the hoist.

Herein the electrical devices forming the master-slave relationship are Selsyns of which herein three are employed, a Selsyn control transfer 32, a Selsyn motor 33 and a Selsyn generator 34. The latter of these is operatively connected with the shaft 6 of the hoist so as to partake of the same rotation as the shaft and this Selsyn constitutes the master during the time that the speed control means is governing the hoist. The Selsyn is adapted for receiving energization from an alternating current voltage source represented at 35 and has three leads 36 connected to blades 37 forming a part of the switch 21. The switch 21 is operable through the blades 37 electrically to connect the Selsyn 34 with either the Selsyn 32 or the Selsyn 33 and, to that end, has two sets of contacts or terminals 38 and 39 of three terminals each. The terminals of the first set 38 are by leads 40 connected to Selsyn 32 and the terminals of the set 39 are by leads 41 connected to the Selsyn 33. The Selsyn 33 is adapted for energization from an alternating current voltage source represented at 42 and Selsyn 32 is by leads 43 connected to stationary contacts or terminals 44 associated with the blades 27 and 28.

The rotors of the Selsyns 32 and 33 are connected together by a shaft 45 and are in turn, through a shaft 46, connected to one element 47 of a clutch, generally designated CL. The other element 48 of the clutch is by a shaft 49 connected with the manual control element 13.

Both the clutch CL and the switch 21 are electrically actuated and, to that end, the clutch has an actuating coil 50 and the switch 21 has an actuating coil 51 connected in series in a circuit 52 having also in series a suitable voltage source 53 and a switch 54 which is located on the control element 13 and which must be actuated before the control element can be rotated. In the normal position, that is, when the actuating coil 50 is not energized, the clutch CL is open and the switch 21 is in its upper position, that is, with the blades 28 and 27 making contact, respectively, with the stationary contacts 20 and 23 and with the blades 37 making contact with the terminals or stationary contacts 39. Upon closure of the switch 54, the clutch CL will be engaged and the switch 21 will be shifted to its down position in which the blades 28 and 27 now make contact with the terminals 44 and the blades 37 make contact with the terminals 38. It will be appreciated that the blades of the switch 21 are interconnected by a common shaft 55.

To aid in giving an understanding of this invention, the operation thereof will be briefly described. Let it be assumed that the hoist is in a raised position and that it is carrying a load which is to be lowered to a precise, lower position and that the distance through which the load is to be moved is considerable. Under those circumstances, the operator or attendant would grasp the manual control element 12 and swing the same counterclockwise, as viewed in Fig. 1, thereby causing the generation of a main signal calling for a lowering of the hoist. Depending upon the extent or angle through which the control element 12 is rotated, the hoist would be driven at a slow speed or at the full speed of the motor 9. Normally the operator would swing the control handle 12 at a moderate rate, thereby permitting the hoist to have a normal acceleration and, after that normal acceleration, to reach and remain at full speed of the motor 9. Under this speed control, the distance through which the hoist travels is, of course, determined entirely by the rate at which it is driven multiplied by the length of time that it is driven at that rate. Thus, after a given interval of time, and as the load carried by the hoist approaches its desired final position, the attendant swings the control element 12 in the opposite direction decelerating the hoist and eventually bringing the load carried by the hoist to rest removed a short distance from its final position. The final position can be quite closely approximated for, after all, the speed control is capable of causing the motor to operate at any speed from full speed down to zero and, inasmuch as the final control signal is in part determined by the pilot signal that is generated by the pilot generator 24, the system is stable in operation.

During this control by the speed control means, the Selsyn 34 has, of course, been driven by the hoist shaft 6 and, since it has been electrically connected with Selsyn 33, the latter has remained in equivalent phase position with Selsyn 34 and hence with the shaft 6. Selsyn 32 has during this period been electrically disconnected but, inasmuch as it is physically connected through the shaft 45 with Selsyn 33, its rotor too has been maintained in definite positional relationship with respect to the shaft 6 of the hoist. It is pointed out at this time that Selsyn 32 and Selsyn 33 are connected physically so as to have their rotors displaced 90°. The reason for this will be readily understood by those skilled in the art. When the Selsyns 33 and 34 are connected, the end sought and the result obtained is the maintenance of a physical relationship between the Selsyns 33 and 34, hence torque for rotating the rotor of Selsyn 33. When the Selsyns 32 and 34 are connected, the end sought is the obtaining of a signal from Selsyn 32 calling for operation of the hoist motor in a particular direction if the position of the hoist does not correspond to the position of the rotor of Selsyn 32. As a consequence, when the Selsyns 32 and 34 are electrically connected and the rotor of Selsyn 32 bears that relationship to Selsyn 34 which is maintained when Selsyn 33 is electrically connected to Selsyn 34 and is driven thereby, the signal generated by Selsyn 32 will be zero. Upon any departure from the above condition, a signal of other than zero magnitude and of a character depending upon the direction of departure will be generated.

To drive the hoist through the remaining short distance necessary to place the load in precise position, commonly known as inching, the attendant now turns to the position control means, grasps the control element 13 and closes the switch 54. Such closure of the switch 54 simultaneously engages the clutch CL coupling the control element 13 to the rotor of Selsyn 32 and shifts switch 21 to its lower position in which the blades 27 and 28 now make contact with the stationary contacts 44 and the blades 37 now contact with the stationary contacts 38. Selsyn 32 is now electrically connected with Selsyn 34 and is, moreover, electrically connected with the control signal amplifier 30 of the speed control means. The control element 13 is now rotated counterclockwise, as viewed in Fig. 1, and the hoist follows such movement precisely. With rotation of the control element 13, the rotor of Selsyn 32 is, of course, rotated and thus the phase relationship between it and Selsyn 34 is changed and a signal is generated calling for lowering of the hoist. This signal will be gradually reduced and completely wiped out as operation of the hoist rotates the rotor of Selsyn 34 and eventually causes it to have such a phase relationship with respect to Selsyn 32 that the signal is completely eliminated. Thus whether the control element 13 be rotated through a few degrees or whether it be given several complete rotations, the hoist will be driven to follow precisely, and only by such precise following and eventual arrest in the precise position called for is the signal eliminated. Not only may a load thus be lowered to a precise position, but it will also be held in precise position, for any slight departure will immediately set up a signal tending to restore the load to the precise position.

When the attendant again wishes to raise the hoist, he simply opens the switch 54 which disengages the clutch CL and restores the switch 21 to its normal up position. It is to be appreciated that the clutch CL is biased to disengaged position, the switch 21 is biased to up position, and the control element 12 is biased to its neutral or zero position. The speed control means thus is again in control and the hoist may be raised at any desired speed by swinging the control element 12 clockwise, as viewed in Fig. 1.

In the modified form of the invention shown for exemplary purposes in Fig. 2, the hoist is still represented generally by the reference character 4'. The hoist comprises generally a drum or winch 5' fixed on a shaft 6' and having a cable or the like 7' wound about the drum and carrying at its free end a member 8'. The member 8' is the member whose position is to be controlled and may, of course, represent an electromagnet, a grapple hook, or the like. Power means is provided for driving the shaft 6' in opposite directions and at varying speeds and herein includes an electric motor 9' and gearing 10'. While the motor and the gearing may vary so that adjustment of one or the other may bring about reversal in the direction of rotation of the shaft 6' and the driving thereof at varying speeds, these adjustments are here accomplished through the employment of a reversible, variable speed motor. As in the first form of the invention, the hoist is controlled by means which will hereinafter be referred to as "speed control means" and by other means which will hereinafter be referred to as "position control means," though in this form of the invention the speed control means takes the form of a stepped-up or speeded-up position control means.

More particularly, the control system comprises signal generating means operable to produce a signal of opposite phase so as to determine the direction of rotation in which the shaft 6' is driven. This signal generating means herein is composed of a pair of Selsyns 60 and 61. The Selsyn 60 is by a pair of leads 62 connected to an amplifier 63 in turn electrically connected with the motor 9' and functioning to amplify and otherwise condition the signal so as to render it capable of controlling the motor 9'. The Selsyn 60 is also by a plurality of leads 64 connected to the Selsyn 61 which is energized from a suitable voltage source represented at 65. The Selsyn 61 has its rotor mechanically connected with the shaft 6' so as to partake of the direction and extent of rotation of that shaft. It will be readily understood to those skilled in the art that whenever, due to any cause whatsoever, the rotors of the two Selsyns are out of step a signal will be generated in the Selsyn 60 which can be utilized to drive the hoist motor 9' in such direction and for such period of time as is required to move the hoist to such extent that the rotor of Selsyn 61 is again in step with the rotor of Selsyn 60.

It is readily seen that Selsyn 60 is the master and that depending upon the direction and extent of rotation given to its rotor the hoist will be likewise driven until the rotor of Selsyn 61 is again in step with the rotor of the master Selsyn 60. Alternately employable means are provided for rotating the rotor of Selsyn 60 and depending upon the speed at which the rotor is driven the system is employable either for speed control or for fine and accurate position control. The alternately employable means comprises a constant speed motor 66 and a hand wheel 67. The latter is nonrotatably affixed to the input shaft 68 of a reversible and variable transmission 69 having an output shaft 70 connected to the rotor of the master Selsyn 60. A clutch CL' is adapted to couple or uncouple the constant speed motor 66 from the shaft 68. The clutch CL' is electrically controlled and to that end has associated therewith an electrical control coil or solenoid 71 connected in series with a manually actuable switch 72 in a clutch control circuit 73. The clutch CL' is adapted to be in disengaged position when the switch 72 is open and to be in engaged or coupled position when the switch 72 is closed.

The transmission 69 has a manual control element 74 which has a neutral or zero position and may be swung to either side of its neutral position. In neutral there is no transmission of rotation whatsoever from the input shaft 68 to the output shaft 70. As the control element 74 is swung to either side of neutral position, transmission of rotation between the shafts 68 and 70 does take place and the direction in which the shaft 70 is rotated depends upon the direction from neutral in which the control element 74 is swung and the speed of rotation for any given speed of the shaft 68 also increases as the control element 74 is swung through a progressively greater angle away from its neutral position.

It may aid the understanding of this invention briefly to describe the operation. Let it be assumed, therefore, that the switch 72 is open and that, accordingly, the clutch CL' is disengaged. Under this arrangement, the input shaft 68 of the transmission 69 can be rotated only from the hand wheel 67, and the signal output of the Selsyn system is of an amplitude proportional to degree of error between actual and intended positions of the driven member. If now the operator or attendant swings the control element 74 in either direction from its neutral position and then rotates the hand wheel 67, the rotor of the master Selsyn 60 will, of course, be rotated and will then become out of step with the rotor of the Selsyn 61, thereby setting up a signal of a certain character calling for movement of the hoist in one direction, at a speed determined by the speed of rotation of the master Selsyn rotor, and wholly independent of the length of time during which such drive is to be maintained, or the distance of the member from the position which it is to have at termination of such drive. If the control element 74 is but slightly displaced from its neutral position, the ratio between rotations of the shaft 68 and the shaft 70 will, of course, be large and thus an extremely fine control of the hoist is attained. If the control element 74 is swung to its extreme in either direction from its neutral position the ratio between rotation of the shaft 68 and shaft 70 may, depending upon the nature of the transmission, be 1:1 or even a higher factor. It will be apparent that, nevertheless, through the medium of the hand wheel 67 very accurate control of the position of the hoist is still attainable.

Where it is desirable to move the hoist through a considerable distance and hence where it is a saving of time to drive the same at a rather high rate of speed, the hand wheel 67 is abandoned in favor of the motor 66. Accordingly, the switch 72 is closed energizing the coil 71 and engaging the clutch CL'. As a result, the input shaft 68 of the transmission 69 is now driven at the speed of the motor 66. Through manipulation of the control element 74, the attendant may now drive the rotor of the Selsyn 60 in either direction and at any desired speed from zero to some speed above or below the constant speed of the motor 66 depending upon the ratio maintained between the shafts 68 and 70 when the control element 74 is in either of its extreme positions.

We claim as our invention:

1. A control system for governing the movement of a member comprising electrically controlled power means for driving the member at varying speeds in either of two opposed directions, an amplifier circuit for receiving a control signal and rendering the same suitable to control said power means, and control means for generating electrical signals to which said amplifier circuit responds including a plurality of manually and independently operable signal sources having separate outputs, one of said signal sources being arranged to produce a signal having a distance representing value proportional to degree of error between actual and intended positions of said member for accurate positioning of the member, the other being arranged to produce a signal having a speed producing value proportional to intended speed of drive through an indeterminate distance for traversing the member, and switching means having a first and second positions respectively connecting said outputs to said amplifier circuit.

2. A control system for governing the movement of a member comprising electrically controlled power means for driving the member at varying speeds in either of two opposed directions, an amplifier circuit for receiving a control signal and rendering the same suitable to control said power means, and control means for generating electrical signals to which said amplifier circuit responds including a first Selsyn driven to have a direction and extent of movement corresponding to that of the member to be controlled, a second Selsyn electrically connected with said first Selsyn for producing a position error signal and with said amplifier circuit to apply such signal to the amplifier control input, manual means for rotating said second Selsyn to produce such a position error signal for inching control of the member, and means for taking over control from said manual means and producing a speed error signal for controlling the drive of the member at higher rates including a manually operable element for determining the direction and rate of movement of the member, and electrical means effective during control by said second control means and responsive to operation of said power means to maintain said second Selsyn in positional correspondence with such a member.

3. A control system for governing the movement of a member comprising electrically controlled power means for driving the member at varying speeds in either of two opposed directions, an amplifier circuit operable to receive electrical signals and render them of a character and magnitude suitable for controlling said power means, a first control means for governing movement of the member through speed control of said power means, a second control means including a first Selsyn driven to have a movement corresponding to that of the member, a second Selsyn adapted to be connected to said amplifier circuit, a third Selsyn mechanically connected with said second Selsyn, said first and said third Selsyns having connection to a common voltage source, a manual control element, a clutch for coupling or uncoupling said last named manual control element from said second Selsyn, a switch for connecting said first control means to said amplifier and said first Selsyn to said third Selsyn and in the alternative connecting said second Selsyn to said amplifier and said first Selsyn to said second Selsyn, and electrical means for simultaneously controlling said clutch and said switch.

4. A control system for governing the movement of a member comprising electrically controlled power means for driving the member at varying speeds in either of two opposed directions, an amplifier circuit operable to receive electrical signals and render them of a character and a magnitude suitable for controlling said power means, a first control means for governing movement of the member comprising manually controlled signal generating means operable to generate a main signal of opposed character and adjustable magnitude, and means for generating a pilot signal varying in magnitude and character with the speed and direction of movement of the member, said pilot signal generating means being connected in the input to said amplifier circuit in inverse feed-back, a second control means for governing the movement of the member comprising a first Selsyn mechanically driven to have a movement corresponding to that of the member, a second Selsyn adapted to be connected to said amplifier circuit, a third Selsyn mechanically connected with said second Selsyn, said first and said third Selsyns having connection to a common voltage source, a manual control element, a clutch for coupling or uncoupling said last named manual control element and said second Selsyn, a switch for connecting the signal generating means of said first control means to said amplifier and said first Selsyn to said third Selsyn and, in the alternative, connecting said second Selsyn to said amplifier and said first Selsyn to said second Selsyn, and electrical means for simultaneously controlling said clutch and said switch to couple said second Selsyn and its manual control element when said second Selsyn is electrically connected to said amplifier.

5. A fine position signal-generating system for selective control of a signal controlled power system for moving a member, such power system including power means for driving such a member at varying speeds and in either of two opposed directions in correspondence to sense and magnitude of a control signal, and a second signal-generating system connectible to and disconnectible from said power means manually actuable to produce a signal of selectable sense and magnitude; said fine position control system comprising a Selsyn generator mechanically connected with said power means for operation in correspondence to drive of such a member, a Selsyn control transformer manually operable to a position representative of a required position of such member, a Selsyn motor mechanically coupled to said control transformer, and switch means for selectively coupling said motor or said control transformer to said generator respectively to maintain said transformer in positional correspondence with such a driven member or to generate a signal representative of error between an actual position of such a driven member and a required position represented by the position of said control transformer, and means for connecting the output of said control transformer to said power means when said second signal-generating system is disconnected from it.

6. A control system for covering the movement of a member, comprising electrically controlled power means for driving the member at varying speeds in either of two opposite directions, an amplifier circuit operable to receive electrical signals and condition them for controlling said power means, a first control means for governing movement of the member through speed control of said power means; a second control means for governing the movement of the member through position control of said power means, a position control system that includes a first electrical device mechanically coupled with the motor, and a second electrical device operable when coupled electrically with said first device and with said amplifier circuit and when mechanically coupled with said second control means to maintain the member in positional correspondence with the second control means; a third electrical device operable when coupled electrically with said first device and mechanically with said second device to maintain the latter in step with the member; a selector system including switching means operable to selectively electrically couple either said second or said third electrical device with said first electrical device and simultaneously with said amplifier circuit, a pair of mechanical coupling devices operable selectively and respectively to mechanically couple said second electrical device with said second control means or with said third electrical device, and a selector arranged to simultaneously operate said switching means and said coupling devices to selectively electrically couple said second device with said amplifier circuit and first electrical device and simultaneously mechanically couple it with said second control means and uncouple it from said third electrical device or to couple said third device electrically with said first device and mechanically with said second device and to mechanically couple and uncouple said second electrical device with and from the third electrical device and second control means respectively, and means operable by said selector system to connect and disconnect said first control means to and from the amplifier circuit respectively as the second electrical device is disconnected from and connected with it.

HERBERT ZIEBOLZ.
PAUL GLASS.

REFERENCES CITED

The following references are of record in the file of this patent:

UNITED STATES PATENTS

| Number | Name | Date |
|---|---|---|
| 935,327 | Routin | Sept. 28, 1909 |
| 2,064,454 | Wittkuhns et al. | Dec. 15, 1936 |
| 2,095,208 | Wilhelm et al. | Oct. 5, 1937 |
| 2,115,086 | Riggs | Apr. 26, 1938 |
| 2,131,951 | Hodgman | Oct. 4, 1938 |
| 2,147,674 | Satterlee | Feb. 21, 1939 |
| 2,189,193 | Brown | Feb. 6, 1940 |
| 2,224,710 | Vickers | Dec. 10, 1940 |
| 2,297,719 | Satterlee | Oct. 6, 1942 |
| 2,372,185 | Wittkuhns | Mar. 27, 1945 |
| 2,429,642 | Newton | Oct. 28, 1947 |
| 2,434,259 | Burton | Jan. 13, 1948 |
| 2,434,836 | Conklin | Jan. 20, 1948 |